(12) United States Patent
Rowse et al.

(10) Patent No.: US 6,212,866 B1
(45) Date of Patent: Apr. 10, 2001

(54) SINGLE FRAME PULL RAKE

(76) Inventors: Dan D. Rowse, 2315 N., Ord, NE (US) 68862; Ron A. Rowse, HC80 Box 43, Burwell, NE (US) 68823

(*) Notice: Subject to any disclaimer, the term of this patent is extended or adjusted under 35 U.S.C. 154(b) by 0 days.

(21) Appl. No.: 09/374,968

(22) Filed: Aug. 16, 1999

(51) Int. Cl.⁷ .......................... A01D 76/00; A01D 78/00; A01D 80/00; A01D 84/00
(52) U.S. Cl. ........................................ 56/384; 56/DIG. 21
(58) Field of Search .............................. 56/377, 375, 366, 56/365, 380, 379, 384, 367, 397, 396, DIG. 21

(56) References Cited

U.S. PATENT DOCUMENTS

| | | |
|---|---|---|
| 2,837,888 | 6/1958 | Van Der Lely et al. . |
| 3,069,833 * | 12/1962 | Van Der Lely ......................... 56/366 |
| 3,077,722 | 2/1963 | Sadler et al. . |
| 3,080,699 | 3/1963 | Van Der Lely . |
| 3,091,907 | 6/1963 | Van Der Lely . |
| 3,143,846 * | 8/1964 | Savage ................................... 56/366 |
| 3,320,735 | 5/1967 | Sutherland et al. . |
| 3,609,950 | 10/1971 | Remy . |
| 4,231,218 | 11/1980 | Delgado . |
| 4,403,468 | 9/1983 | Yoder . |
| 4,685,282 | 8/1987 | Allen . |
| 4,800,713 | 1/1989 | Symonds . |
| 5,313,772 * | 5/1994 | Tonutti ................................... 56/377 |
| 5,396,756 | 3/1995 | Franklin ................................. 56/366 |
| 5,743,075 * | 4/1998 | Aron et al. ............................. 56/366 |
| 5,899,055 * | 5/1999 | Rowse et al. .......................... 56/377 |
| 5,918,452 * | 7/1999 | Kelderman ............................ 56/377 |

* cited by examiner

Primary Examiner—Robert E. Pezzuto
Assistant Examiner—Arpad Fabian Kovacs
(74) Attorney, Agent, or Firm—Zarley, McKee, Thomte, Voorhees & Sease

(57) ABSTRACT

The line of pull from a prime mover extends along a tongue assembly pivotally connected to a wheel rake frame assembly and intersects with the rear discharge end of the frame assembly when the rake is at its maximum angle of attack and with the extended longitudinal axis when the angle of attack is at its minimum thereby balancing forces on the rake and minimizing rake drift such that a consistent width of cut material can be raked.

11 Claims, 6 Drawing Sheets

SINGLE FRAME PULL RAKE

BACKGROUND OF THE INVENTION

The present day single frame pull rake having rake wheels along the longitudinal axis of the frame will have a line of pull from the prime mover through the rake frame generally centered between the opposite ends of the rake frame. The problem with this arrangement is that the forces generated by the cut material moving along the length of the rake from the rake's forward end to the rearward discharge end increase and thus tend to reduce the rake's angle of attack. What is needed to overcome this problem is a rake having tongue and frame assemblies with a steerable support wheel that will balance the forces on the frame assembly such that a consistent angle of attack will be maintained.

SUMMARY OF THE INVENTION

A tongue assembly is hydraulically pivoted to a frame assembly having a steerable support wheel at its rear cut material discharge end with the line of pull from a prime mover extending substantially through the pivot axis between the tongue assembly and frame assembly and the pivot axis of the steerable rear wheel. Changing the angle of attach of the rake will vary the point at which the line of pull intersects with the rake frame varying between the discharge end at the steerable wheel of the rake to a point on the frame assembly extended rearwardly when the angle of attack is reduced.

DESCRIPTION OF THE PREFERRED EMBODIMENTS

Figure 6:
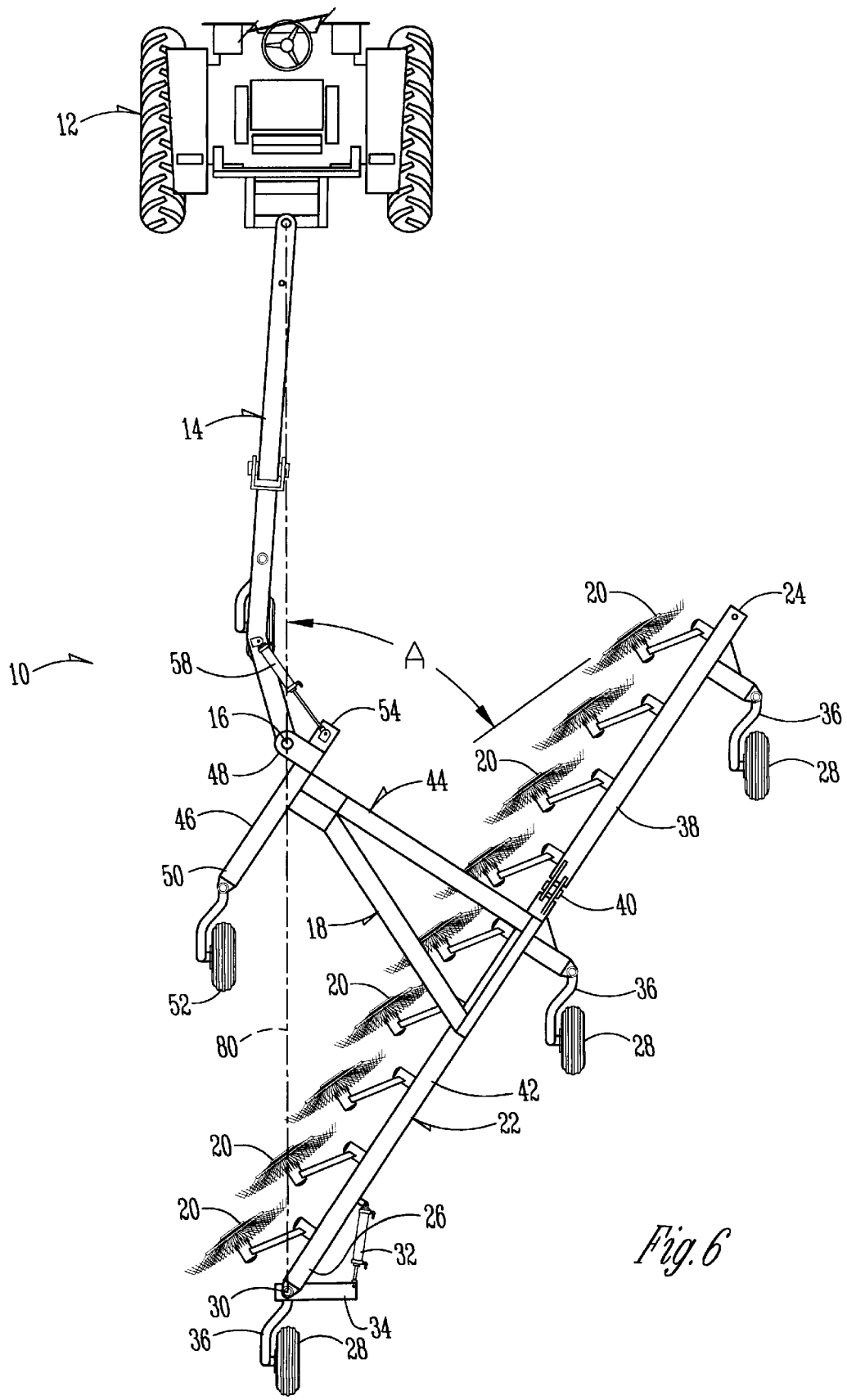
FIG. 6 is a top plan view thereof showing the typical maximum angle of attack represented by the angle A. An alternate embodiment of the steerable rear end support wheel is shown.

The wheel rake of this invention is referred to generally in FIG. 6 by the reference numeral 10 as seen being pulled by a prime mover 12.

The rake 10 includes a tongue assembly 14 pivotally connected about an axis 16 to a frame assembly 18 having a series of rake wheels 20 along the length of a rear main frame 22. The main frame 22 has a forward end 24 and a trailing rear end 26 where a steering support wheel 28 is positioned for pivoting about a vertical axis 30 in response to a hydraulic cylinder 32 extending between the main frame 22 and a bracket 34 rigidly connected to a wheel shank 36.

The main frame 22 includes a forward frame portion 38 connected by a hinge 40 to a rear frame portion 42.

The frame assembly 18 includes in addition to the rear frame 22 a bridge frame portion 44 which extends from the rear frame portion 42 over the rake wheels 20 and terminates in a forward frame member 46 connected to the tongue assembly 14 through a device 48 for pivotable movement about the pivot axis 16. The forward frame member 46 has a rear end 50 to which a ground support wheel 52 is pivotally connected. An opposite forward end 54 of the forward frame member 46 is connected by a hydraulic cylinder 58 to the tongue assembly 14.

Figure 5:
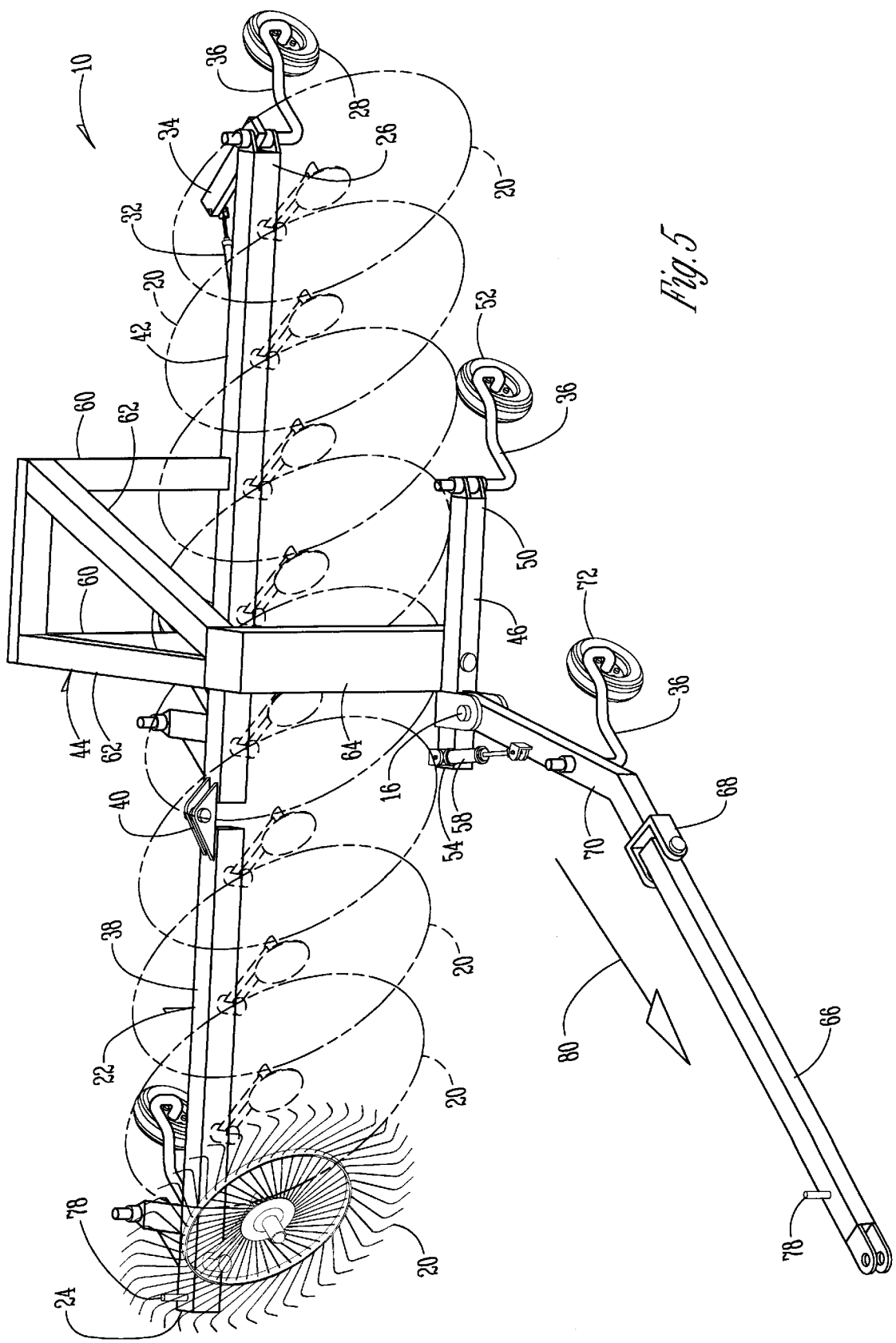
FIG. 5 is a front perspective view of the rake.

As seen in FIG. 5 the bridge frame portion 44 includes rear frame legs 60 rigidly connected to the rear frame portion 42 of the rear main frame 22. A "V" shaped horizontal frame portion 62 extends over the rake wheels 20 and engages a forward vertical frame leg 64 which in turn rigidly engages the forward cross frame member 46. As further seen in FIG. 5 the tongue assembly 14 includes a forward tongue member 66 connected through a hinge 68 to a rear tongue member 70 having a support wheel 72.

Figure 4:
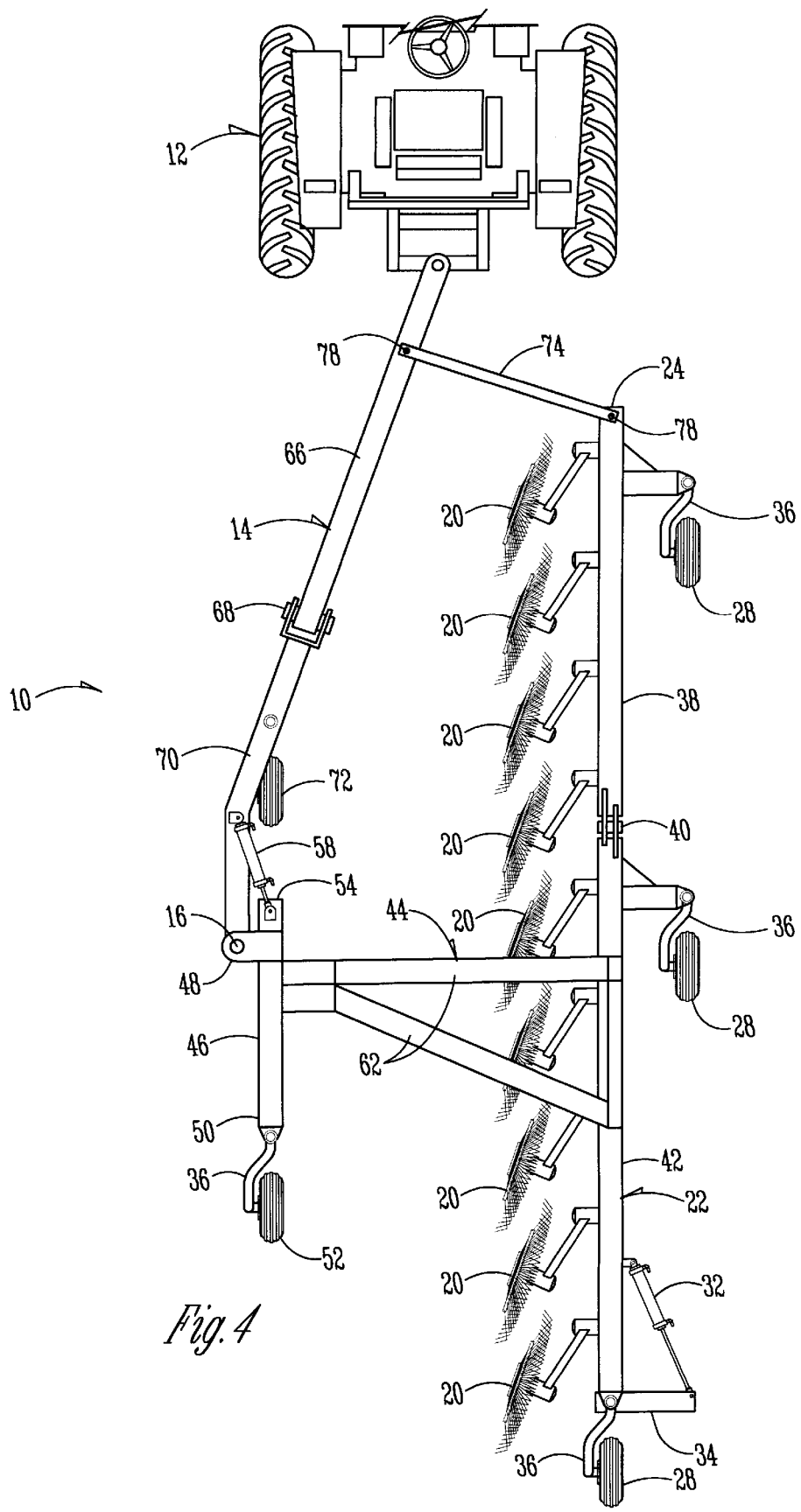
FIG. 4 is a top plan view of the rake in a transport position.

In FIG. 4 the rake 10 is in a transport position with the forward end 24 of the forward frame portion 38 being locked by a brace to the forward tongue member 66 by the brace 74 engaging a pin 78.

Figure 1:
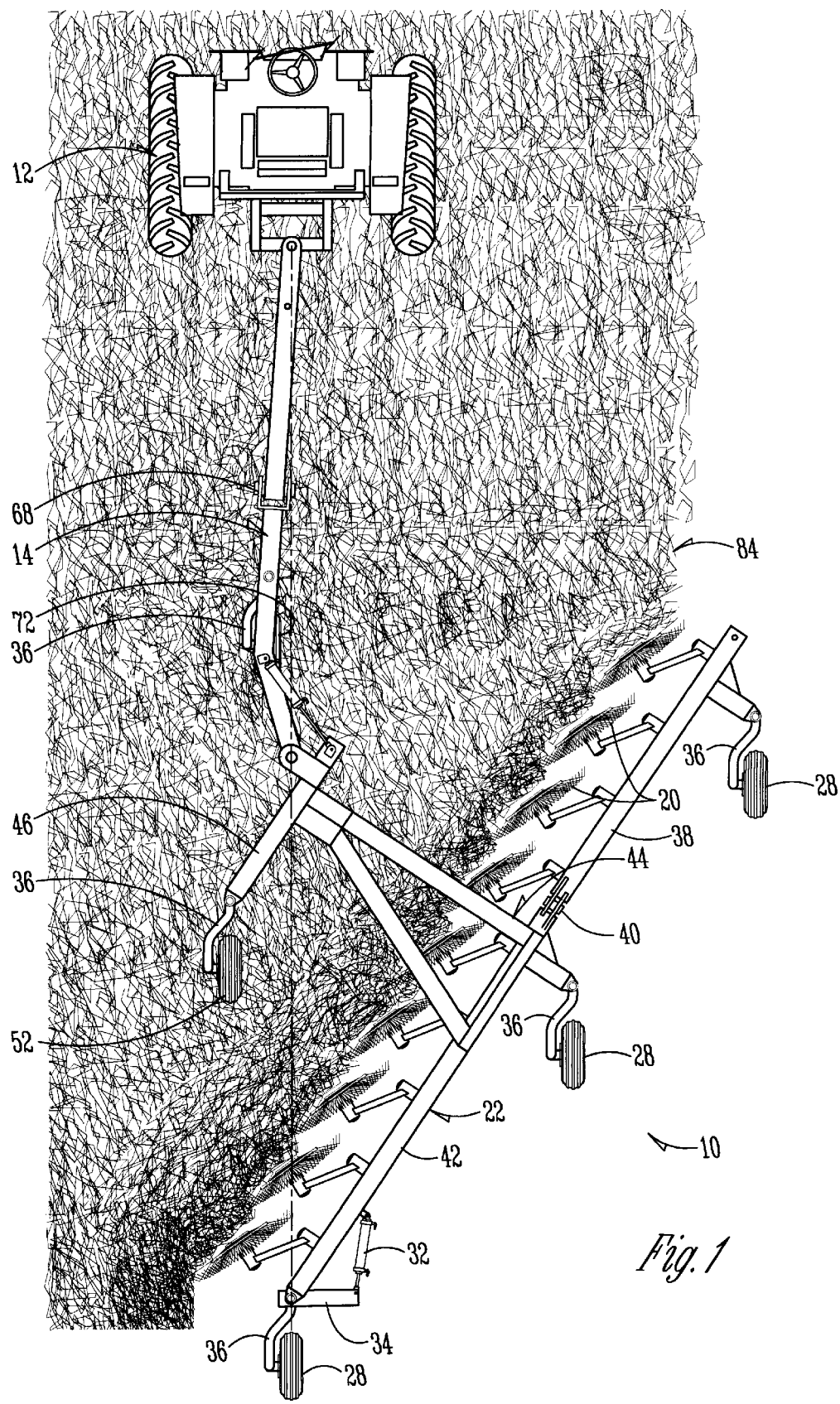
FIG. 1 is a top plan view of the wheel rake of this invention in field operation showing the cut material being moved along the rake wheels from the forward end to the rear discharge end.
Figure 2:
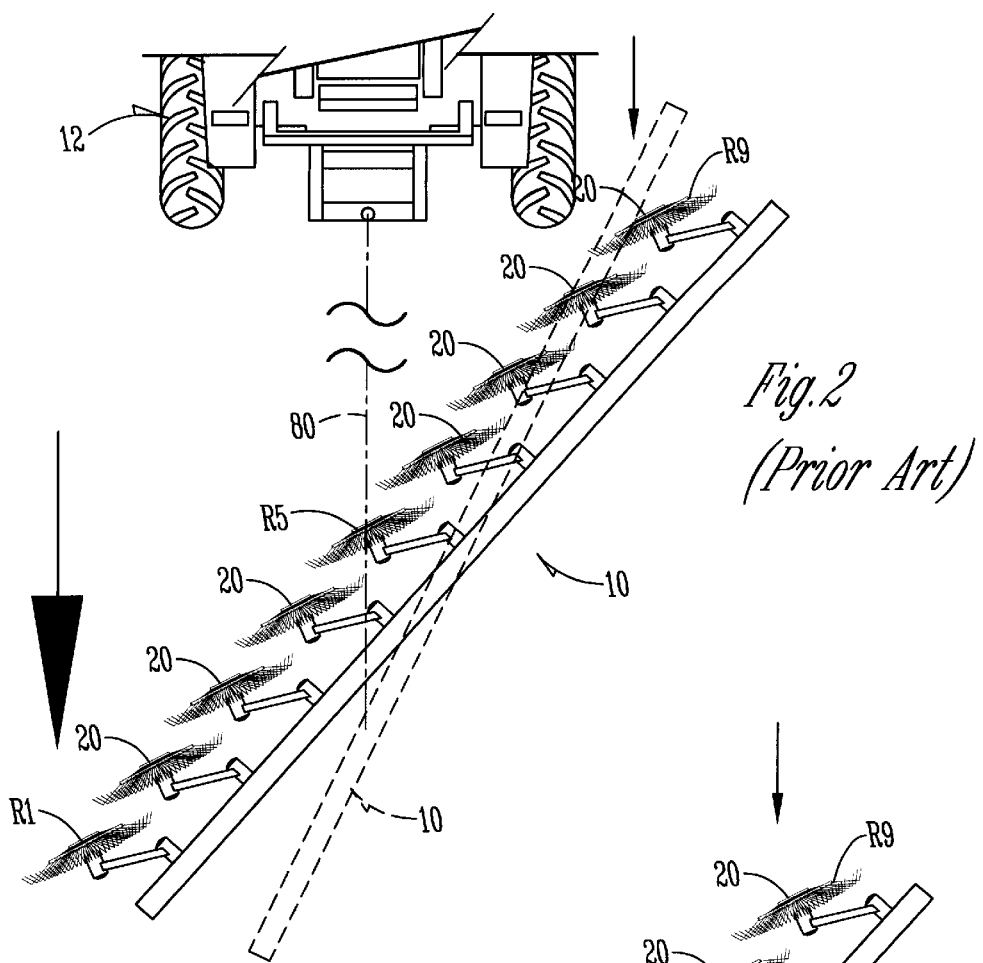
FIG. 2 is a top plan view of the rake main frame and rake wheels of a typical prior art rake wherein the line of pull from the tractor to the rake frame is generally centered between the rake frame opposite ends allowing the cut material forces on the rake rear discharge end to cause the rake to drift to a position shown by the rake frame in dashed lines involving a reduced angle of attack.
Figure 3:
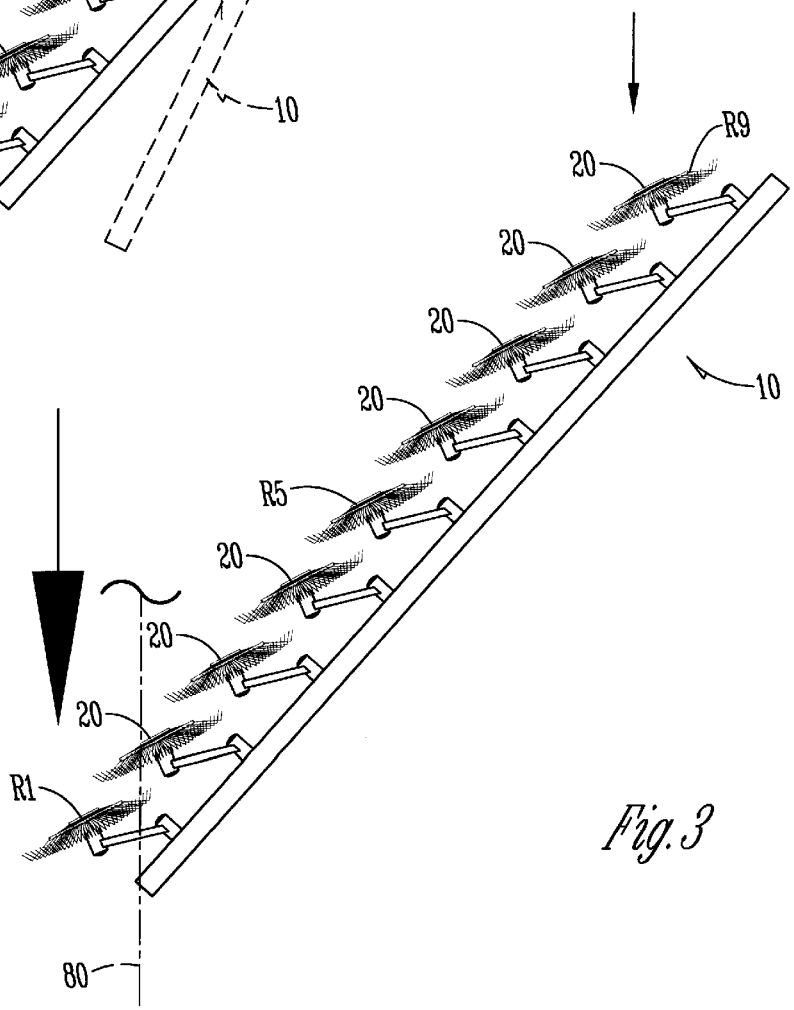
FIG. 3 is a view similar to FIG. 2 but illustrating the rake of this invention wherein the line of pull is through the rear discharge end of the rake thereby allowing the rake to maintain a fixed angle of attack.
Figure 7:
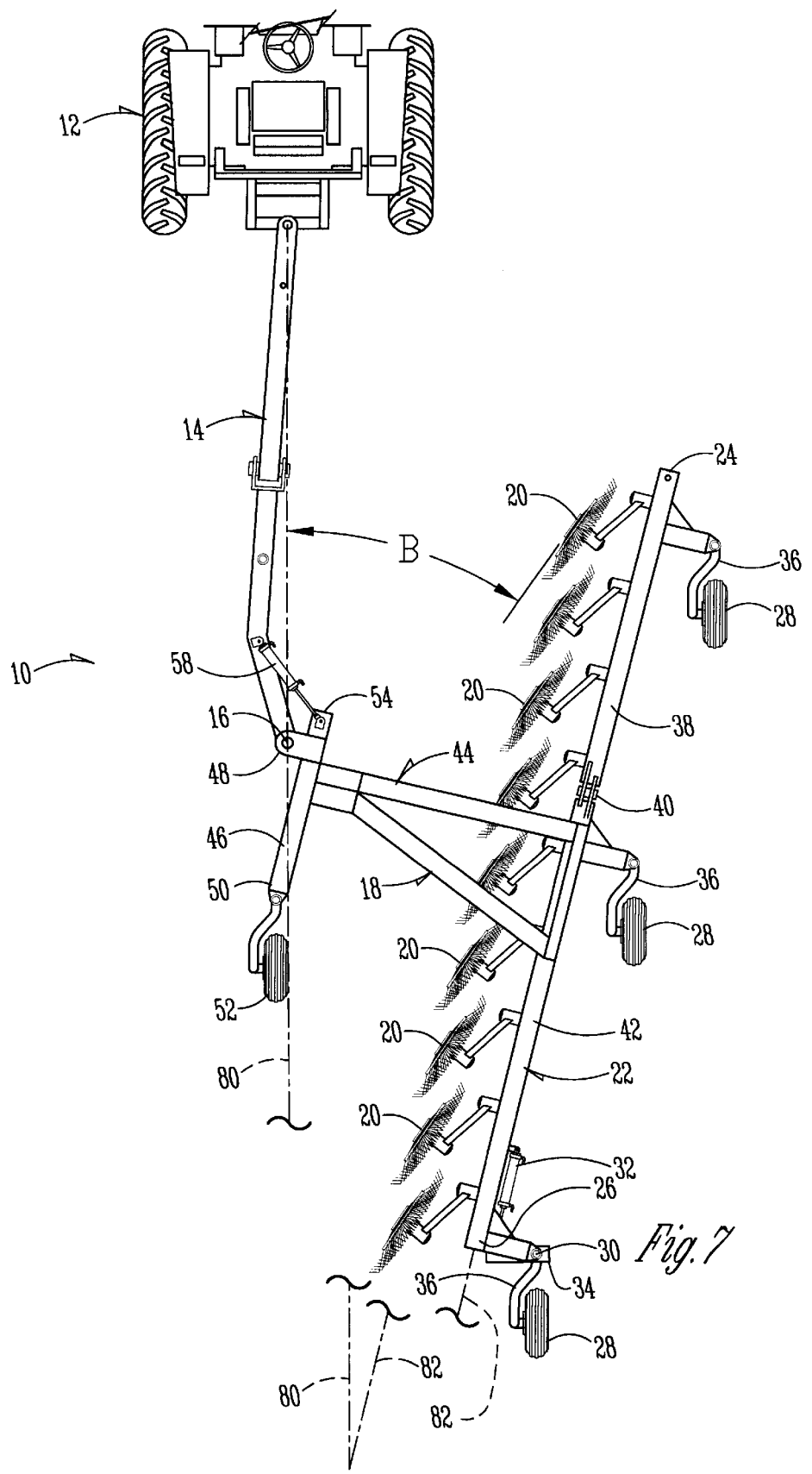
FIG. 7 is a view similar to FIG. 6 but showing a reduced angle of attack represented by the angle B and showing the line of pull intersecting with the longitudinal axis of the rake extended rearwardly.

In operation, it is seen in FIG. 6 that a maximum angle of attack A of approximately 55° establishes a line of pull 80 through the pivot axis 30 of the steerable support wheel 28 and also through the pivot axis 16 between the tongue assembly 14 and the frame assembly 18. In FIG. 7, however, the minimum angle of attack B of approximately 35° causes the line of pull 80 to intersect an extended longitudinal axis 82 of the rear main frame 22. Thus, it is seen that the width of the material 84 as seen in FIG. 1 being raked will remain constant as the line of pull is through the center of the maximum opposing force applied to the rake when the angle of attack is at its greatest as seen in FIG. 6 and when the angle of attack is reduced as seen in FIG. 7 the forces on the rake frame at its discharge end are reduced, minimizing the problem and easily allowing the steerable wheel 28 to maintain a consistent course.

The angle of attack may be varied by operation of the power cylinder 58 pivotally interconnecting the tongue assembly 14 to the frame assembly 18 and the power cylinder 32 connected to the steering support wheel 28 will be operated as appropriate to maintain the desired angle of attack.

In FIG. 7 it is seen that the steerable wheel 28 and its pivot axis 30 have been moved from the rear discharge end of the main frame 22 rearwardly such that the wheel 28 and its mounting to the main frame 22 does not interfere with storage of the wheel rake 10.

What is claimed is:

1. A pull type rake for windrowing cut material comprising, a frame assembly with a raking means having a longitudinal axis, said frame assembly being pivotally connected to a tongue assembly for moving the frame assembly between transport and field positions and when in said field position varying the width of the cut material being windrowed by varying the angle between the longitudinal axis of the frame assembly with said raking means and the tongue member, said frame assembly with rake means having forward and rearward ends, said rearward end being freely moveable as said frame assembly with rake means pivots relative to said tongue assembly, and said tongue assembly having a forward end adapted to be connected to a prime mover and a rear end pivotally connected to said frame assembly establishing a line of pull through said forward and rear connections varying from extending through the rear end of said frame assembly with said rake means to extending through the extended longitudinal axis of said frame assembly with said rake means extended rearwardly of said frame assembly with said rake means rear end for minimizing drift of said frame assembly with said rake means when in said field position.

2. The rake of claim 1 wherein a hydraulic cylinder is provided for pivoting said frame assembly relative to said tongue assembly.

3. The rake of claim 2 wherein said frame includes a plurality of ground support wheels along its length.

4. The rake of claim 3 wherein one of said ground support wheels is positioned at the rear end of said frame assembly and is steerable to vary the angle between the longitudinal axis of said frame assembly and said tongue assembly.

5. The rake of claim 4 wherein said steerable wheel has a pivot axis and the line of pull extends through or close to said pivot axis when said frame assembly is in said field position.

6. The rake of claim 5 wherein said steerable wheel includes a hydraulic cylinder for pivoting said wheel about its pivot axis.

7. The rake of claim 6 wherein said raking means includes rake wheels rotatably mounted on arms pivotably connected to said frame assembly along its substantial length.

8. The rake of claim 5 wherein the line of pull extends through or close to the pivot axis of said tongue assembly pivotally connected to said frame assembly.

9. The rake of claim 1 wherein said frame assembly when in said transport position the forward end thereof is connected by a brace member extending to said tongue assembly.

10. The rake of claim 1 wherein said frame assembly includes a rear main frame and a bridge frame portion which extends from said rear main frame over said rake means and terminates in a forward frame member parallel to said rear main frame to which said tongue assembly is pivotally connected.

11. The rake of claim 10 wherein said forward frame member includes opposite forward and rearward ends with said rearward end having a ground support wheel and the forward end being pivotally connected by a hydraulic cylinder to said tongue assembly for varying the angle between said raking means and said tongue assembly.

* * * * *